United States Patent
Hasegawa

[11] Patent Number: 6,105,971
[45] Date of Patent: Aug. 22, 2000

[54] METAL GASKET

[75] Inventor: Hirokazu Hasegawa, Yamato, Japan

[73] Assignee: Nippon Reinz Co., Ltd., Kanagawa-prefecture, Japan

[21] Appl. No.: 09/042,857

[22] Filed: Mar. 17, 1998

[30] Foreign Application Priority Data

Mar. 19, 1997 [JP] Japan ................................ 9-065993

[51] Int. Cl.[7] ............................................. F02F 11/00
[52] U.S. Cl. ............................................................. 277/593
[58] Field of Search .................................. 277/592, 593, 277/594, 598, 591

[56] References Cited

U.S. PATENT DOCUMENTS

| | | |
|---|---|---|
| 4,397,472 | 8/1983 | Czernik . |
| 4,721,315 | 1/1988 | Ueta . |
| 4,799,695 | 1/1989 | Yoshino . |
| 4,807,892 | 2/1989 | Udagawa . |
| 4,898,396 | 2/1990 | Udagawa . |
| 5,255,926 | 10/1993 | Udagawa . |
| 5,490,681 | 2/1996 | Plunkett et al. . |
| 5,511,796 | 4/1996 | Udagawa . |
| 5,582,415 | 12/1996 | Yoshida et al. . |
| 5,893,566 | 4/1999 | Miyaoh et al. . |

FOREIGN PATENT DOCUMENTS

| | | |
|---|---|---|
| 0 494 489 | 7/1992 | European Pat. Off. . |
| 0 590 944 | 4/1994 | European Pat. Off. . |
| 0 757 195 | 2/1997 | European Pat. Off. . |
| 0 797 029 | 9/1997 | European Pat. Off. . |

*Primary Examiner*—Anthony Knight
*Assistant Examiner*—Karlena D. Schwing
*Attorney, Agent, or Firm*—Merchant & Gould P.C.

[57] ABSTRACT

The present invention relates to a metal gasket for use in sealing the joint surfaces of the cylinder head and the cylinder block of an internal combustion engine. The metal gasket comprises a plural number of metal plates and a rigid resin layer, each of said metal plates having opening(s) corresponding to the combustion chamber hole(s) of the gasket and bolt holes. The plural number of the metal plates are laminated so as to be overlaid on each other. The first metal plate disposed on the side of one outer surface of the gasket has a bent portion formed by turning back the peripheral portion of its opening, said bent portion having a curved portion which defines the combustion chamber hole and a flange portion. The bent portion of the first metal plate encloses the peripheral portion of the opening of one of the remaining metal plates having a bead portion for surrounding the combustion chamber hole. The annular rigid resin layer is disposed in the recess of said bead portion and covered with other metal plate. The thickness of a part of the gasket in which the rigid resin layer is disposed is larger than that of the remaining part of the gasket. The difference in partial thickness of the gasket can be adjusted by the thickness of the rigid resin layer. The rigid resin layer is preferably a layer of a thermocured epoxy resin.

14 Claims, 5 Drawing Sheets

Fig.1 PRIOR ART
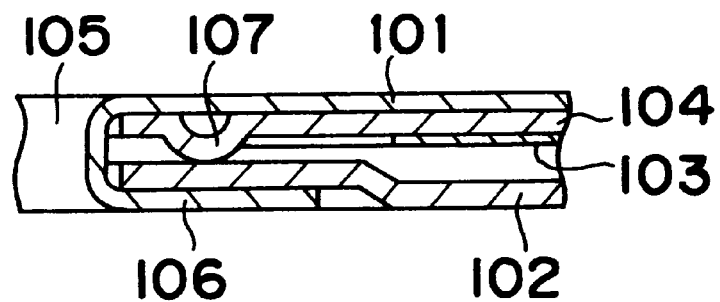
Fig.2 PRIOR ART
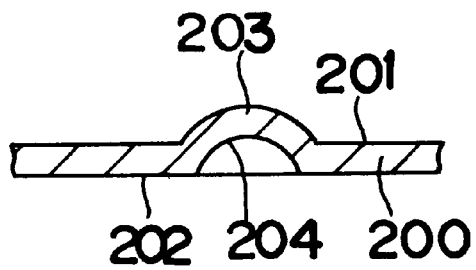
Fig.3 PRECEDING INVENTION
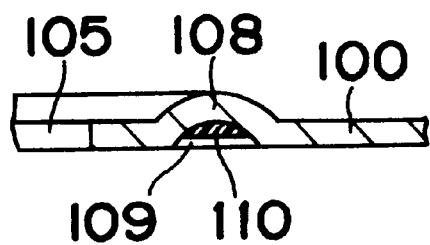

h > h' h > h'

METAL GASKET

BACKGROUND OF THE INVENTION AND RELATED ART STATEMENT

The present invention relates to a metal gasket, what is called a cylinder head gasket for use in sealing the joint surfaces of the cylinder head and the cylinder block of an internal combustion engine.

A conventional cylinder head gasket is constructed by laminating a plural number of metal plates each having combustion chamber hole(s), bolt holes, hole(s) for water passage, hole(s) for oil passage and the like: for example, an upper plate 101, intermediate plate 104, thickness-adjusting plate 103 having a thickness smaller than that of the upper plate 101, and lower plate 102 are laminated as shown in FIG. 1, and a bead portion 107 for surrounding the combustion chamber hole 105 is formed on the intermediate plate 104 at a position corresponding to the bent portion 106 of the upper plate 101. The bead portion, as shown in FIG. 2, in general, has a projection 203 formed on one surface 201 of the metal plate 200 and a corresponding recess 204, which is formed on the other side of the projection 203, in the other surface 202 thereof. The term "bead portion" referred to in the present specification means such a bead portion as mentioned above.

In the above cylinder head gasket, the thickness of a part of the gasket in which the bent portion of the peripheral portion of the combustion chamber hole 105 is disposed is larger than that of the remaining part of the gasket. In this regard, the wording "the thickness of a part of the gasket" referred to in the present specification means the sum of the thickness of the metal plates and the thickness of a rigid resin layer which are laminated at the relevant part. When such a gasket is fastened between the joint surfaces of a cylinder head and a cylinder block, an annular high sealing pressure zone takes place around the peripheral portion of the combustion chamber hole 105 due to the above difference in partial thickness of the gasket. The high sealing pressure is further increased by addition of a sealing pressure resulting from the resilience of the bead portion 107.

It is, however, difficult to construct a gasket with a difference in partial thickness between the peripheral portion of the combustion chamber hole 105 and its outside portion of the gasket so that a desired sealing pressure distribution can be created, because the above difference in partial thickness is determined by the difference in thickness between the metal plates 101 and 103. Further, the fastening force the gasket receives when fastened differs depending on a distance from a bolt hole, and therefore, the sealing pressure applied to the peripheral portion of the combustion chamber hole differs depending on a distance from the bolt hole. To uniform the sealing pressure, it is required to vary and adjust the above difference in partial thickness of the gasket in accordance with a distance from the bolt hole. Such adjustment is however practically impossible for the laminate gasket as mentioned above.

The assignee of the present invention has previously proposed the following metal gasket in Japanese Patent Application No. 8-38787 (Japanese Laid-Open Patent Publication No. 9-210205 issued on Aug. 12, 1997): the metal gasket, as shown in FIG. 3, comprises a resilient metal plate 100 and a bead portion 108 for surrounding a combustion chamber hole 105, wherein a rigid resin layer 110 is disposed in the recess 109 of the bead portion 108 and the thickness of the rigid resin layer 110 is varied in accordance with a distance from a bolt hole (not shown).

The rigid resin layer 110 of the invention of the above application serves as a stopper for limiting the compression degree of the bead portion 108. The provision of the rigid resin layer 110 thickens the part of the gasket in which the rigid resin layer 110 is disposed more than the remaining part of the gasket, thereby causing a higher sealing pressure around the combustion chamber hole 105. Further, the thickness of the rigid resin layer 110 can be adjusted freely, and adjustment of the thickness thereof in accordance with a distance from the bolt hole can be easily made.

The gasket shown in FIG. 3, however, has the following problems. When the gasket is applied between a cylinder head and a cylinder block, the rigid resin layer comes into contact with the joint surfaces of the cylinder head and the cylinder block, and therefore, the rigid resin layer is worn down by friction with the joint surfaces due to vibrations of the cylinder head and the cylinder block during operation of the engine and due to the expansion and contraction of the cylinder head and the cylinder block accompanying the start and stop of operation of the engine. Further, there is another problem that the rigid resin layer deteriorates due to exposure to a high temperature combustion gas.

SUMMARY OF THE INVENTION

The present invention has been made to solve the above problems, and an object thereof is to provide a metal gasket which permits free adjustment of difference in partial thickness of the gasket between the annular sealing portion around the combustion chamber hole and the remaining portion of the gasket, and which also permits the difference in partial thickness of the gasket to be varied in accordance with a distance from a bolt hole. Another object of the present invention is to provide a metal gasket which can eliminate the problem that the rigid resin layer provided for attaining the above object is worn down by friction with the joint surfaces of a cylinder head and a cylinder block during operation of an engine, and which can also eliminate the problem that the rigid resin layer is exposed to a high temperature combustion gas.

A metal gasket of the present invention capable of achieving the above objects comprises a plural number of metal plates and an annular rigid resin layer, each of said metal plates having at least one opening corresponding to the combustion chamber hole(s) of the gasket and bolt holes. The plural number of the metal plates are laminated so as to be overlaid on each other. The first metal plate disposed on the side of the outer surface of the gasket has a bent portion formed by turning back the peripheral portion of its opening, said bent portion having a curved portion which defines the combustion chamber hole of the gasket and is connected to a main portion of the first metal plate and a flange portion which extends generally parallel with the main portion, and said bent portion enclosing the peripheral portion of the opening of at least one of the remaining metal plates. One of the metal plate enclosed by the bent portion has a bead portion for surrounding the combustion chamber hole, said bead portion being projected so as to form a corresponding recess in the inner surface on the other side of the metal plate. The annular rigid resin layer is disposed in the recess of the bead portion, and its thickness is smaller than the depth of the recess of the bead portion. The recess of the bead portion and the rigid resin layer are covered by one of the metal plates. The thickness of a part of the gasket in which the annular rigid resin layer is disposed is increased by addition of the thickness of the rigid resin layer to the thickness of the laminated metal plates, and it is therefore larger than the thickness of the remaining part of the gasket.

The difference in partial thickness of the gasket can be freely varied by adjusting the thickness of the rigid resin layer.

Also, in the gasket of the present invention, the thickness of a part of the rigid resin layer at a position spaced away from a bolt hole is designed to be larger than the thickness of a part of the rigid resin layer at a position in the vicinity of the bolt hole, so that a sealing pressure applied to the peripheral portion of the combustion chamber hole can be uniformed when the gasket is attached to an engine.

The rigid resin layer is formed of a non-compressible and non-deformable resin which is not substantially compressed or deformed under a compression stress, such as an epoxy resin, thermocurable polyimide resin and silicone resin, and it is formed preferably of an epoxy resin. The rigid resin layer is formed by applying a liquid coating material of a rigid resin, followed by drying and curing. The thickness of the rigid resin layer can be freely varied to a desired thickness, for example, by screen-coating a liquid coating material or by applying it with the use of a dispenser. Further, the thickness of the rigid resin layer can be varied in accordance with a distance from a bolt hole.

The rigid resin layer is disposed in the recess of the bead portion which is covered by another metal plate, and therefore is not worn down by friction with the joint surfaces of the cylinder head and the cylinder block. Further, the bead portion inside which the rigid resin layer is to be disposed is formed in the metal plate which is enclosed at the peripheral portion of its opening by the bent portion of the first metal plate. The rigid resin layer, therefore, is not exposed to a high temperature combustion gas.

It is preferable for the bead portion to have a section in the form of trapezoid.

BRIEF DESCRIPTION OF THE DRAWINGS

FIG. 1 is a sectional view of a conventional cylinder head gasket.

FIG. 2 is a sectional view illustrating a bead portion.

FIG. 3 is a sectional view of a metal gasket of the preceding invention.

DETAILED DESCRIPTION OF THE PREFERRED EMBODIMENTS

Figure 4:
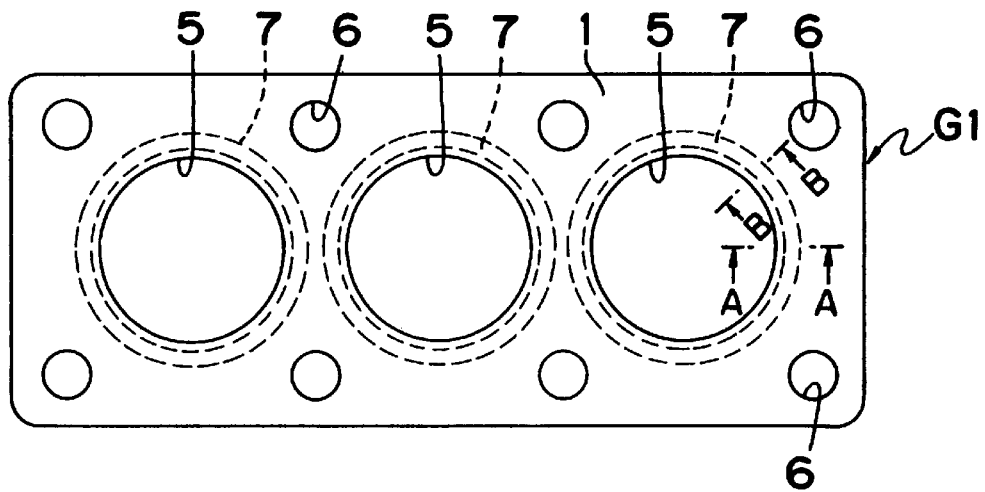
FIG. 4 is a plan view showing the first embodiment of the present invention.
Figure 5:
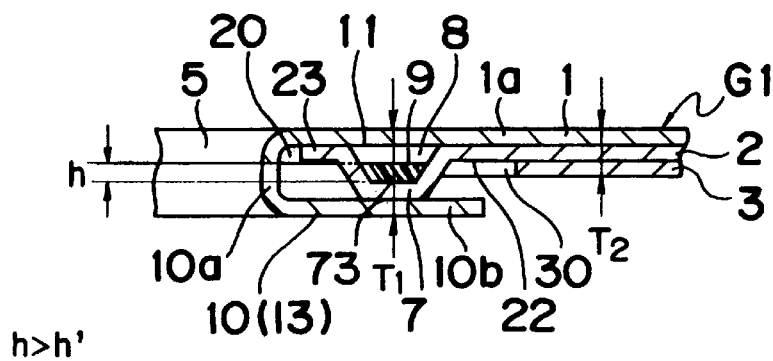
FIG. 5 is a sectional view taken along the line A—A of FIG. 4.
Figure 6:
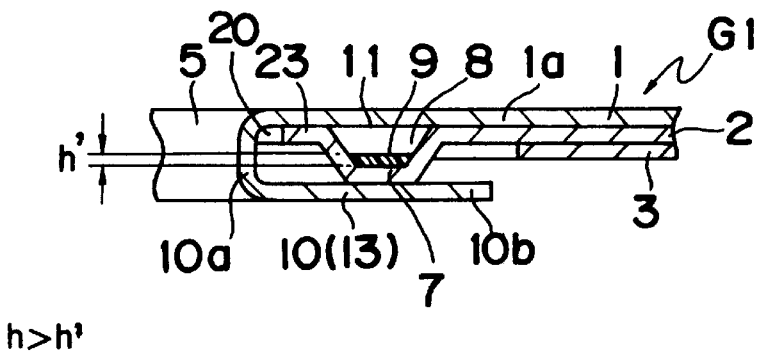
FIG. 6 is a sectional view taken along the line B—B of FIG. 4.

With reference to FIGS. 4 to 6, a cylinder head gasket G1 as the first embodiment of the present invention has combustion chamber hole(s) 5, bolt holes 6, hole for water passage (not shown), holes for oil passage (not shown) and the like, and it comprises a first metal plate 1, second metal plate 2 and third metal plate 3 each made of, for example, stainless steel; and a rigid resin layer 9. Each of the metal plates has at least one opening corresponding to the combustion chamber hole(s) and bolt holes, and the metal plates are laminated so as to be overlaid on each other. The second metal plate 2 is interposed between the first metal plate 1 and the third metal plate 3.

The first metal plate 1 has a bent portion 10 formed by turning back the peripheral portion 13 of its opening, said bent portion 10 having a curved portion 10a and a flange portion 10b. The curved portion 10a defines the combustion chamber hole 5 of the gasket, and the flange portion 10b extends generally parallel with the main portion 1a of the first metal plate 1. The bent portion 10 encloses the peripheral portion 23 of the opening 20 of the second metal plate 2. The peripheral portion 23 is provided with a bead portion 7 having a trapezoidal section which is to surround the combustion chamber hole 5. The bead portion 7 is projected toward the flange portion 10b from the outer surface 22 of the second metal plate 2 with its top 73 in contact with the flange portion 10b. The recess 8 of the bead portion 7 is formed in the inner surface of the second metal plate 2 confronting the first metal plate. The thickness of the third metal plate 3 as a thickness-adjusting plate is equal to or smaller than that of the first metal plate, and it has an opening 30 of a large diameter so as not overlap on the flange portion 10b of the bent portion 10.

The annular rigid resin layer 9 is disposed in the recess 8 of the bead portion 7 so as to fill a part of the depth of the recess 8. The thickness $T_1$ of the part of the gasket in which the rigid resin layer 9 is disposed is larger than the thickness $T_2$ of a part of the gasket outside the above part (a part spaced away from the combustion chamber hole). The difference in thickness $(T_1-T_2)$ is equal to the sum $\{h+(t_1-t_3)\}$ of the difference $(t_1-t_3)$ between the thickness $t_1$ of the first metal plate and the thickness $t_3$ of the third metal plate, and the thickness h of the rigid resin layer. The above difference in thickness, therefore, can be subtly adjusted to a desired value by varying the thickness of the rigid resin layer. When the gasket G1 is applied between the cylinder head and the cylinder block of an engine and fastened, a high sealing pressure zone takes place on the site of the bead portion 7 surrounding the combustion chamber hole 5. The high sealing pressure zone comes from superposition of a high sealing pressure resulting from the above difference in partial thickness and a high sealing pressure resulting from the resilience of the bead portion 7. Further, an appropriate sealing pressure distribution can be created by determining the above difference in partial thickness properly. The rigid resin layer 9 also serves as a stopper for limiting the compression of the bead portion 7, and serves to reduce the amplitude of compression and restoration of the bead portion 7.

As shown in FIGS. 5 and 6, the thickness h of a part of the rigid resin layer 9 at a position spaced away from a bolt hole to which a smaller gasket fastening force is applied is designed to be larger, while the thickness h' of a part of the rigid resin layer 9 at a position in the vicinity of the bolt hole, to which a larger gasket fastening force is applied, is designed to be smaller. The sealing pressure onto the peripheral portion of the combustion chamber hole 5 is uniformed by adjusting the thickness of the rigid resin layer in accordance with a position around the combustion chamber hole 5. As a result, the sealing performance of the gasket can be improved.

Also, the sealing performance of the gasket can be improved by increasing the thickness of the rigid resin layer at a part of the bead portion between each of adjacent combustion chamber holes where the thermal condition is severe, or at parts of the bead portion on the sides of its both lengthwise ends where gas leakage is apt to occur because of bending of a cylinder head. Such adjustment by varying the height of the rigid resin layer filling the recess of the bead portion in accordance with a position around the combustion chamber hole is one of the largest merits of the gaskets of the present invention, and this adjustment is done likewise also in the following embodiments as will be described later, though the description of the adjustment will be omitted in these embodiments for simplicity.

In the gasket G1 as the first embodiment, the peripheral portion 23 of the opening 20 of the intermediate metal plate 2 which is provided with the bead portion 7 is enclosed by the bent portion 10 of the first metal plate 1, and the recess 8 of the bead portion 7 is covered by the inner surface 11 of the first metal plate 1. When the gasket G1 thus constructed is attached to an engine, the rigid resin layer 9 disposed in the recess 8 of the bead portion 7 is utterly shielded from a combustion gas. Accordingly, the rigid resin layer 9 does not deteriorate or burn due to the combustion gas. Further, the rigid resin layer 9 does not come into contact with the joint surfaces of the cylinder head and the cylinder block, and therefore is not worn down by friction therewith.

The bead portion for surrounding the combustion chamber hole may have a section in the form of trapezoid, semicircle, angle or the like, and it is preferable for the bead portion to have a trapezoidal section which has a flat face at its top, in other words, it is preferable for the recess of the bead portion to have a flat face at its bottom. This is because the flat face bottom of the recess facilitates precise measurement and adjustment of the thickness of the rigid resin layer, and because it is preferable for a resulting high sealing pressure zone to have a certain width. It is to be noted that, when the bead portion has a trapezoidal section the top of which has an excessive width, the sealing pressure is dispersed. It is therefore preferable for the top 73 of the trapezoidal section of the bead portion to have a width within a preferred range of 0.5 to 3.0 mm, particularly 1.0 to 2.0 mm.

The rigid resin layer is formed of a non-compressible and non-deformable resin which is not practically compressed or deformed under a compression stress. Examples of such resins include epoxy resins, thermocurable polyimide resins, polyamide-imide resins, silicone resins and the like, and epoxy resins are preferably used. Examples of epoxy resins are of bis-phenol A type, novolak type, aliphatic type, hydantoin type, isocyanate type and the like. As curing agents for the resins, there can be used curing agents for epoxy resins such as amines, hydrazines, acid anhydrides and imidazoles. These agents can be used alone or in combination. In addition, inorganic fillers such as clay, talc and silica are favorably admixed with the resins. The rigid resin layer 9 is formed by, for example, screen-coating a liquid coating material of such a rigid resin as listed above, followed by heating for drying or curing. The resultant rigid resin layer 9 has heat resistance.

The thickness of the rigid resin layer can be freely adjusted, for example, by controlling the density of the solid content of a liquid coating material, selecting a proper size of a mesh for use in screen-coating, repeating the coating a plural number of times or the like. Further, the variation in thickness of the rigid resin layer in accordance with a position around the combustion chamber hole can be easily conducted by repeating partial screen-coating a plural number of times, controlling the coating amount by the use of a dispenser, repeating partial coating a plural number of times or the like.

Although not shown in the drawings, a layer of a conventional heat resistant sealing material such as fluorine rubber and silicone rubber is usually formed on the outside surface of the gasket G1 so as to fill and smooth the imperfection such as flaws, roughness and distortion of the joint surfaces of a cylinder head and a cylinder block.

Figure 7:
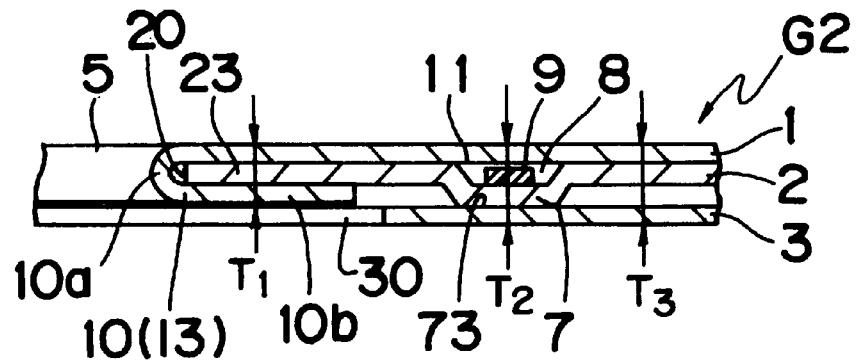
FIG. 7 is a sectional view similar to that of FIG. 5, showing the second embodiment of the present invention.

FIG. 7 shows a cylinder head gasket G2 as the second embodiment of the present invention. In the cylinder head gasket G2, a bead portion 7 is formed in the second metal plate 2 so that the top 73 of the bead portion 7 is in contact with the third metal plate 3 at a position in the outside vicinity of the flange portion 10b of the bent portion 10 of the first metal plate 1, but not in contact with the flange portion 10b of the bent portion 10. A rigid resin layer 9 disposed in the recess 8 of the bead portion 7 has a section in the form of a rectangle having a width longer than the thickness. The gasket G2 is constructed in the same manner as the gasket G1 as the first embodiment except for the above points.

The width of the rigid resin layer 9 having the rectangular section is approximately equal to or less than that of the bottom of the recess 8, and the height of the rigid resin layer is less than the depth of the recess 8. Such a rigid resin layer is formed preferably as follows. A liquid coating material of a rigid resin is applied in a predetermined width and height to a flat metal plate in which a bead portion is not yet formed so that a narrow coating layer of the rigid resin is formed thereon, and then, the coating layer is heated for drying or curing. After that, the metal plate is embossed on and along the narrow coating layer to raise a bead portion with the rigid resin layer therein.

In the gasket G2 as the second embodiment, the difference between the thickness $T_2$ of a part of the gasket in which the bead portion is disposed and the thickness $T_3$ of a part of the gasket outside the former part is equal to the thickness h of the rigid resin layer 9. In addition, the difference between the thickness $T_2$ of the part of the gasket in which the bead portion 7 is disposed and the thickness $T_1$ of a part of the gasket in which the bent portion 10 occupies is equal to a value of $\{h-(t_1-t_3)\}$ which is obtained by subtracting from the thickness h of the rigid resin layer 9 the difference between the thickness $t_1$ of the first metal plate 1 and the thickness $t_3$ of the third metal plate 3.

The sealing pressure resulting from the above difference in partial thickness, therefore, becomes the largest at the part of the gasket G2 in which the bead portion 7 is disposed, and it becomes the second largest at the part of the gasket G2 in which the bent portion 10 is disposed. A sealing pressure resulting from the resilience of the bead portion 7 is further superposed on the former sealing pressure at the part of the gasket in which the bead portion 7 is disposed. The gasket G2 in which the bead potion 7 is disposed at a position outside the bent portion 10 adjacent to a combustion chamber is favorably used in, for example, a liner type engine which has a cylinder liner inserted into the inner wall of the cylinder of a cylinder block. In this case, it is desirable that a high sealing pressure zone takes place on the flange of the liner in order to prevent the cylinder liner from falling and cracking.

Figure 8:
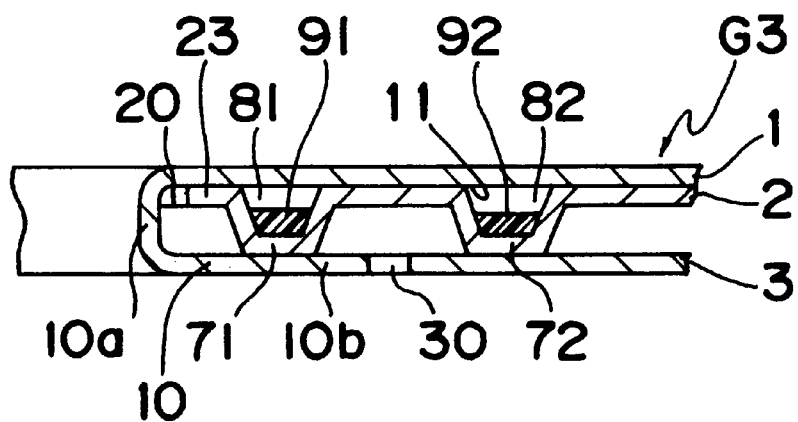
FIG. 8 is a sectional view similar to that of FIG. 5, showing the third embodiment of the present invention.

With reference to FIG. 8, there is shown a cylinder head gasket G3 as the third embodiment of the present invention. The cylinder head gasket G3 comprises a first metal plate 1, a second metal plate 2, a third metal plate 3, a first rigid resin layer 91 and a second rigid resin layer 92. The second metal plate 2 interposed between the first metal plate 1 and the third metal plate 3 is provided with a first bead portion 71 and a second bead portion 72. The top of the first bead portion 71 is in contact with the flange portion 10b of the bent portion 10 of the first metal plate 1. The second bead portion 72 is disposed outside the first bead portion 71, and its top is in contact with the third metal plate 3. A first rigid resin layer 91 and a second rigid resin layer 92 are disposed in the respective recesses 81 and 82 of the bead portions 71 and 72. The thickness of the third metal plate 3 is equal to that of the first metal plate 1. The gasket G3 is constructed in the same manner as the gasket G1 as the first embodiment except for the above points.

The thickness of the first rigid resin layer 91 is a little larger than that of the second rigid resin layer 92. Accordingly, the thickness of the gasket G3 is larger at its two annular parts in which the first and second rigid resin layers 91 and 92 are disposed than at the remaining parts thereof. When the gasket G3 is applied between the joint surfaces of the cylinder head and the cylinder block of an engine, a high sealing pressure zone takes place on the parts in which the first bead portion 71 and the second bead portion 72 are respectively disposed. This high sealing pressure results from superposition of a high sealing pressure due to the above difference in partial thickness of the gasket and a high sealing pressure due to the resilience of the bead portions. Thus, the combustion chamber hole 5 is double-sealed. Where only one annular sealing pressure zone is not enough to prevent leakage of a combustion gas, or where a single high pressure sealing zone remains a trace of the compressed bead portion on a cylinder head made of aluminum, the gasket G3 of the present invention can be effectively used.

Figure 9:
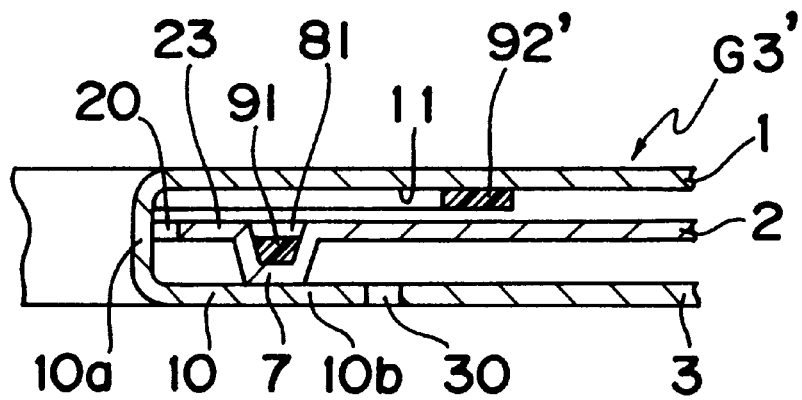
FIG. 9 is a sectional view of a modification of the third embodiment.

FIG. 9 shows a gasket G3' as a modification of the third embodiment of the present invention. In the gasket G3', there are not disposed such a second bead portion and such a second rigid resin layer formed in the recess of the second bead portion as disposed in the gasket G3 of the third embodiment. Alternatively, in the gasket G3', a second rigid resin layer 92' is disposed on a part of the inner surface 11 of the first metal plate 1 corresponding to the part of the above second bead portion of the gasket G3. The structure of the gasket G3' is the same as that of the gasket G3 of the third embodiment except for the above point. Also in the gasket G3', the combustion chamber hole 5 can be double-sealed likewise as in the gasket G3.

Figure 10:
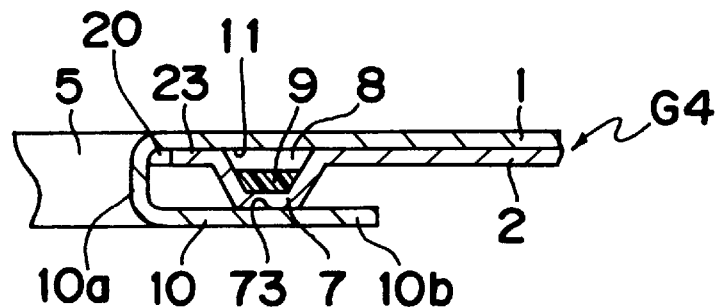
FIGS. 10 to 13 are sectional views of the fourth to seventh embodiments of the present invention.

FIG. 10 shows a cylinder head gasket G4 as the fourth embodiment of the present invention. The cylinder head gasket G4 comprises a first metal plate 1, a second metal plate 2 and a rigid resin layer 9. A bead portion 7 for surrounding a combustion chamber hole 5 is formed in the peripheral portion 23 of the opening 20 of the second metal plate 2. The bent portion 10 of the first metal plate 1 encloses the peripheral portion 23 of the opening 20 of the second metal plate 2, and the flange portion 10b of the bent portion 10 is in contact with the top 73 of the bead portion 7. The annular rigid resin layer 9 is so disposed in the recess 8 of the bead portion 7 as to fill a part of the depth of the recess 8 of the bead portion 7, and it is covered by the inner surface 11 of the first metal plate 1. The structure of the gasket G4 is the same as that of the gasket G1 as the first embodiment except that the gasket G4 does not comprise a third metal plate 3.

Figure 11:
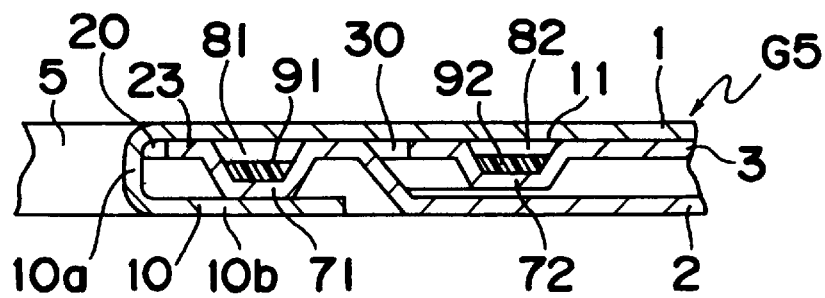

FIG. 11 shows a cylinder head gasket G5 as the fifth embodiment of the present invention. The cylinder head gasket G5 comprises a first metal plate 1, a second metal plate 2, a third metal plate 3, and a first and second rigid resin layers 91 and 92. The first metal plate 1 has a bent portion 10 which encloses the peripheral portion 23 of the opening 20 of the second metal plate 2, and the curved portion 10a of the bent portion 10 defines the combustion chamber hole 5 of the gasket. The third metal plate 3 is interposed between the first metal plate 1 and the second metal plate 2, and it has an opening of a large diameter so as not to overlap on the flange portion 10b of the bent portion 10 of the first metal plate 1. The second metal plate 2 has a first bead portion 71 at the peripheral portion 23 of its opening 20, said first bead portion 71 being projected toward the flange portion 10b of the bent portion 10 of the first metal plate 1 with its top in contact with the flange portion 10b. The third metal plate 3 has a second bead portion 72 at the peripheral portion 33 of its opening 30, said second bead portion 72 being projected toward the second metal plate 2. The first bead portion 71 and the second bead portion 72 run generally parallel with each other, both surrounding the combustion chamber hole 5. The bead portion 72 is positioned outside the bead portion 71.

The first rigid resin layer 91 is disposed in the recess 81 of the bead portion 71, and the second rigid resin layer 92 is disposed in the recess 82 of the bead portion 72, and both resin layers 91 and 92 fill parts of the recesses 81 and 82, respectively. The recesses 81 and 82 and the rigid resin layers 91 and 92 are covered by the inner surface 11 of the first metal plate 1.

The gasket G5, when attached to an engine, can create a variety of desired sealing pressure distributions on the peripheral portion of the combustion chamber hole 5 by properly determining the thickness of the first metal plate 1, the third metal plate 3, the first rigid resin layer 91 and the second rigid resin layer 92 and further the height of the first and second bead portions 71 and 72. It is apparent from the structure of the gasket G5 as described above that the first and second rigid resin layers 91 and 92 of the gasket G5 attached to the engine are not exposed to a high temperature combustion gas nor are worn down by friction with the joint surfaces of the cylinder head and the cylinder block during operation of the engine.

Figure 12:
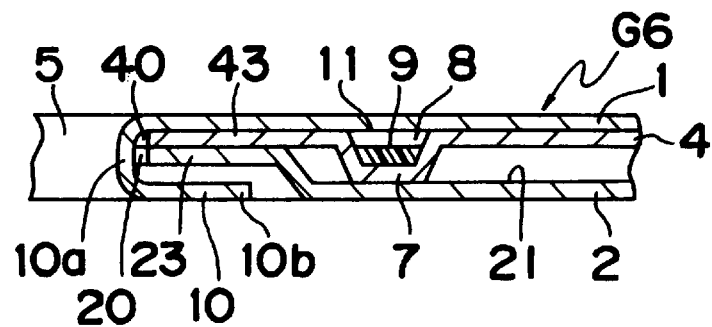

FIG. 12 shows the section of a cylinder head gasket G6 as the sixth embodiment of the present invention. The gasket G6 comprises a first metal plate 1, a second metal plate 2, a fourth metal plate 4, and a rigid resin layer 9. The fourth metal plate 4 is interposed between the first metal plate 1 and the second metal plate 2 and laminated therewith. The peripheral portion 23 of the opening 20 of the second metal plate 2 and the peripheral portion 43 of the opening 40 of the fourth metal plate 4 are both enclosed by the bent portion 10 of the first metal plate 1. The fourth metal plate 4 has a bead portion 7 at a position outside the bent portion 10 of the first metal plate 1, said bead portion 7 being projected toward the second metal plate 2 and surrounding the combustion chamber hole 5. The rigid resin layer 9 is disposed in the recess 8 of the bead portion 7, filling a part of the depth of the recess 8. The recess 8 and the rigid resin layer 9 are covered by the inner surface 11 of the first metal plate 1. The bead portion 7 of the fourth metal plate 4 may be formed projecting toward the first metal plate 1. In this case, the recess 8 of the bead portion 7 and the rigid resin layer 9 disposed therein are covered by the inner surface 21 of the second metal plate 2.

Figure 13:
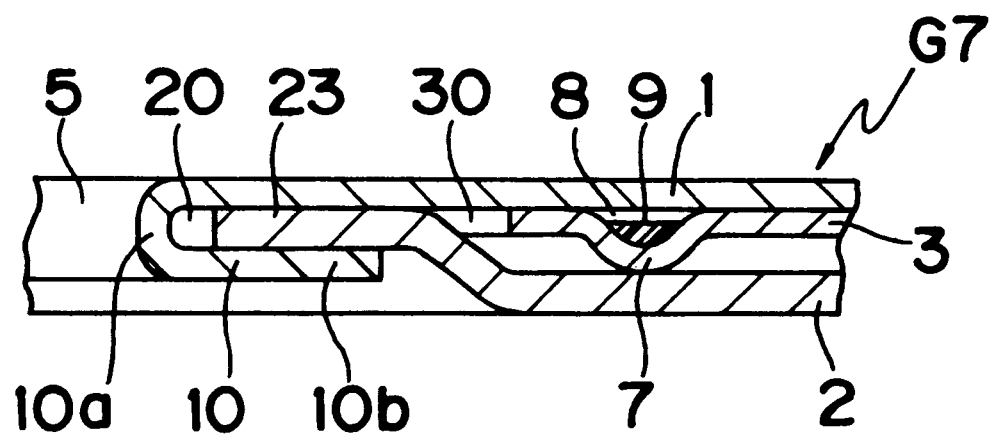

FIG. 13 shows a cylinder head gasket G7 as the seventh embodiment of the present invention. The gasket G7 comprises a first metal plate 1, a second metal plate 2, a third metal plate 3, and a rigid resin layer 9. The first metal plate 1 disposed on the side of the outer surface of the gasket G7 has a bent portion 10 including a curved portion 10a which defines a combustion chamber hole 5 and a flange portion 10b. The bent portion 10 of the first metal plate 1 encloses the peripheral portion 23 of the opening 20 of the second metal plate 2. The third metal plate 3 serves as a thickness-adjusting plate, which is interposed between the first metal plate 1 and the second metal plate 2, and it has an opening 30 of a large diameter so as not to overlap on the flange portion 10b of the bent portion 10. The third metal plate 3 has a bead portion 7 which is projected toward the second metal plate 2, surrounding the combustion chamber hole 5.

The annular rigid resin layer 9 is disposed in the recess 8 of the bead portion 7, filling a part of the depth of the recess 8. The recess 8 of the bead portion 7 and the rigid resin layer 9 disposed therein are covered by the inner surface 11 of the first metal plate 1. The bead portion 7 may be so formed as to be projected toward the first metal plate 1.

The embodiments and their modifications as described above should not be construed as limiting the metal gaskets of the present invention, and they can be altered and modified variously to an extent that they are not beyond the spirit and scope of the present invention.

What is claimed is:

1. A metal gasket for use in sealing joint surfaces of a cylinder head and a cylinder block of an internal combustion engine, the metal gasket comprising a plural number of metal plates and an annular resin layer, each of the metal plates having at least one opening corresponding to the combustion chamber hole of the gasket and bolt holes, wherein:

the plural number of the metal plates are laminated so as to be overlaid on each other, and a first metal plate disposed on the side of one outer surface of the gasket has a bent portion formed by turning back a peripheral portion of the opening, the bent portion having a curved portion which defines the combustion chamber hole of the gasket and is connected to a main portion of the first metal plate, and a flange portion which extends generally parallel with the main portion, and the bent portion enclosing the peripheral portion of the opening of at least one of the remaining metal plates;

the at least one of the remaining metal plates enclosed by the bent portion has a bead portion for surrounding the combustion chamber hole, the bead portion being projected toward such a direction as to form a recess in a surface inside the outer surface of the gasket;

the annular resin layer is disposed inside of the recess, filling a part of the depth of the recess, and the recess and the resin layer are covered by one of the plural number of the metal plates other than the metal plate having the bead portion;

the thickness of the gasket in an annular portion in which the resin layer is disposed is thicker than the thickness of the gasket in a remaining portion thereof; and the annular resin layer serves as a stopper for limiting the compression of the bead portion when the gasket is compressed between the joint surfaces.

2. A metal gasket according to claim 1, wherein the projection of the bead portion has a section in the form of a trapezoid.

3. A metal gasket according to claim 2, wherein the width of the top of the trapezoid is 0.5 to 3.0 mm.

4. A metal gasket according to claim 2, wherein the section of the rigid resin layer disposed on the flat bottom of the recess of the bead portion is in the form of a rectangle having a width larger than the thickness.

5. A metal gasket according to claim 1, wherein the bead portion and the rigid resin layer disposed in the recess of the bead portion surround the combustion chamber hole at a position corresponding to the flange portion of the bent portion.

6. A metal gasket according to claim 1, wherein the projected bead portion and the rigid resin layer disposed in the recess of the bead portion surround the combustion chamber hole at a position outside the flange portion of the bent portion.

7. A metal gasket according to claim 1, wherein a plural number of bead portions and a plural number of rigid resin layers disposed in the recesses of said bead portions surround the combustion chamber hole at a position corresponding to the flange portion of the bent portion and at a position outside the flange portion, respectively.

8. A metal gasket according to claim 1, wherein the thickness of a part of the rigid resin layer spaced away from a bolt hole is larger than that of a part of the rigid resin layer in the vicinity of the bolt hole.

9. A metal gasket according to claim 1, wherein one of the metal plates laminated has an opening of a large diameter so as not to overlap on the flange portion of the bent portion of the first metal plate.

10. A metal gasket according to claim 9, wherein said metal plate having the opening of a large diameter is provided with a bead portion and a rigid resin layer disposed in the recess of the bead portion, both for surrounding the combustion chamber hole at-a position outside the flange portion, said metal plate being interposed between the first metal plate and the metal plate which is enclosed at its peripheral portion of the opening by the bent portion of the first metal plate.

11. A metal gasket according to claim 1, wherein the rigid resin layer is formed of an epoxy resin.

12. A metal gasket for use in sealing joint surfaces of a cylinder head and a cylinder block of an internal combustion engine, the metal gasket comprising a plural number of metal plates and an annular resin layer, each of the metal plates having at least one opening corresponding to the combustion chamber hole of the gasket and bolt holes, wherein:

the plural number of the metal plates are laminated so as to be overlaid on each other, and a first metal plate disposed on the side of one outer surface of the gasket has a bent portion formed by turning back a peripheral portion of the opening, the bent portion having a curved portion which defines the combustion chamber hole of the gasket and is connected to a main portion of the first metal plate, and a flange portion which extends generally parallel with the main portion, and the bent portion enclosing the peripheral portion of the opening of at least one of the remaining metal plates;

one of the metal plates having an opening of a large diameter so as not to overlap on the flange portion of the bent portion is interposed between the first metal plate and the metal plate enclosed by the bent portion, the metal plate with the large diameter opening having a bead portion for surrounding the combustion chamber hole, which is provided on the peripheral portion of the opening;

the annular resin layer is disposed inside of the recess, filling a part of the depth of said recess;

the thickness of the gasket in an annular portion in which the resin layer is disposed is thicker than the thickness of the gasket in a remaining portion thereof; and the annular resin layer serves as a stopper for limiting the compression of the bead portion when the gasket is compressed between the joint surfaces.

13. A metal gasket according to claim 12, wherein the thickness of a part of the rigid resin layer at a position spaced away from a bolt hole disposed around the combustion chamber hole is larger than that of a part of the rigid resin layer in the vicinity of the bolt hole.

14. A metal gasket according to claim 12, wherein the annular rigid resin layer is formed of an epoxy resin.

* * * * *